United States Patent
Belluomini et al.

(10) Patent No.: US 8,284,627 B2
(45) Date of Patent: Oct. 9, 2012

(54) REDUCING ENERGY CONSUMPTION AND OPTIMIZING WORKLOAD AND PERFORMANCE IN MULTI-TIER STORAGE SYSTEMS USING EXTENT-LEVEL DYNAMIC TIERING

(75) Inventors: Wendy A. Belluomini, San Jose, CA (US); Joseph S. Glider, Palo Alto, CA (US); Jorge Guerra Delgado, Miami, FL (US); Himabindu Pucha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 12/910,144

(22) Filed: Oct. 22, 2010

(65) Prior Publication Data

US 2012/0102350 A1    Apr. 26, 2012

(51) Int. Cl.
*G11C 5/14* (2006.01)
(52) U.S. Cl. ........ 365/226; 365/227; 365/229; 713/300; 713/320
(58) Field of Classification Search .................. 365/226, 365/227, 229; 713/300, 320
See application file for complete search history.

(56) References Cited

U.S. PATENT DOCUMENTS

| | | | |
|---|---|---|---|
| 6,173,306 B1 | 1/2001 | Raz et al. | |
| 6,185,601 B1 | 2/2001 | Wolff | |
| 6,385,663 B2 | 5/2002 | Senator | |
| 6,477,558 B1 | 11/2002 | Irving et al. | |
| 6,886,035 B2 | 4/2005 | Wolff | |
| 7,376,765 B2 | 5/2008 | Rangan et al. | |
| 7,441,154 B2 | 10/2008 | Klotz et al. | |
| 8,185,754 B2 * | 5/2012 | Gill et al. | 365/226 |
| 2009/0089524 A1 | 4/2009 | Fujihara et al. | |

OTHER PUBLICATIONS

Barroso, L.A. et al., "The Case for Energy-Proportional Computing", IEEE Computer Society, Dec. 2007, pp. 33-37.

(Continued)

*Primary Examiner* — Thong Q Le
(74) *Attorney, Agent, or Firm* — Mohammed Kashef

(57) ABSTRACT

Embodiments of the invention relate to reducing energy consumption and optimizing workload and performance in multi-tier storage systems using extent-level dynamic tiering. An aspect of the invention includes a receiving data access information of a storage extent stored in a storage system and utilization information of storage devices in the storage system. The storage system includes a plurality of storage tiers and each of the plurality of storage tiers is made up of a plurality of storage devices. Storage resources required for each of the plurality of the storage tiers to satisfy the storage extent's performance and capacity requirements are estimated based on the data access information. One storage tier that would incur the lowest power consumption to the storage system for satisfying the storage extent's performance and capacity requirements is determined. The one storage tier is determined by calculating the amount of power that would be consumed by the storage extent in each of the plurality of storage tiers based on the estimated storage resources. At least one storage device in the one storage tier that has available storage resources that would satisfy the storage extent's performance and capacity requirements is determined based on the data access information and utilization information. The storage extent is allocated to the one storage tier and to one storage device (among the at least one storage device) that has the least amount of available storage capacity.

21 Claims, 8 Drawing Sheets

OTHER PUBLICATIONS

Colarelli, D. et al., "Massive Arrays of Idle Disks for Storage Archives", Proceedings of the IEEE/ACM SC2002 Conference (SC'02), 11 pages.
Guerra, J. et al., "Energy Proportionality for Storage: Impact and Feasibility", In ACM/USENIX HotStorage, 2009, pp. 35-39.
Mandagere, N. et al., "GreenStor: Application-Aided Energy-Efficient Storage", 24th IEEE Conference on Mass Storage Systems and Technologies (MSST 2007), 14 pages.
Narayanan, D. et al., "Write Off-Loading: Practical Power Management for Enterprise Storage", In 6th FAST, 2008, 16 pages.
Narayanan, D. et al., "Everest: Scaling down peak loads through I/O off-loading", Proceedings of the 8th USENIX Conference on Operating Systems Design and Implementation, 2008, pp. 15-28.
Pinheiro, E. et al., "Energy Conservation Techniques for Disk Array-Based Servers", ICS'04, Jun. 26-Jul. 1, 2004, Saint-Malo, France, pp. 68-78.
Sankar, S. et al., "Sensitivity Based Power Management of Enterprise Storage Systems", In 16th MASCOTS, 2008, 10 pages.
Weddle, C. et al., "PARAID: A Gear-Shifting Power-Aware RAID", ACM Transactions on Storage, vol. 3, No. 3, Article 13, Publication date: Oct. 2007, 34 pages.
Zhu, Q. et al., "Reducing Energy Consumption of Disk Storage Using Power-Aware Cache Management", In 10th HPCA, 2004, 12 pages.
Greenan, K.M. et al., "A Spin-Up Saved is Energy Earned: Achieving Power-Efficient, Erasure-Coded Storage", Proceedings of the Fourth Conference on Hot Topics in System Dependability, 2008, 6 pages.
Karche, G. et al., "Using Dynamic Storage Tiering", Symantec Yellow Books, Apr. 2006, 195 pages.
Laliberte, B., "Automate and Optimize a Tiered Storage Environment—FAST!", Enterprise Strategy Group White Paper, Dec. 2009, 9 pages.
Lee, H.J. et al., "Augmenting RAID with an SSD for Energy Relief", Proceedings of the 2008 Conference on Power Aware Computer and Systems, 2008, 5 pages.
Li, D. et al., "EERAID: Energy Efficient Redundant and Inexpensive Disk Array", In 11th Workshop on ACM SIGOPS, European Workshop, 2004, 6 pages.
Pinheiro, E. et al., "Exploiting Redundancy to Conserve Energy in Storage Systems", SIGMetrics/Performance '06, Jun. 26-30, 2006, Saint Malo, Frances, pp. 15-26.
Verma, A. et al., "SRCMap: Energy Proportional Storage using Dynamic Consolidation", Proceedings of the 8th USENIX Conference on File and Storage Technologies, 2010, 14 pages.
Yao, X. et al., "RIMAC: A Novel Redundancy-based Hierarchical Cache Architecture for Energy Efficient, High Performance Storage Systems", SIGOPS EuroSys'06, Apr. 18-21, 2006, Leuven, Belgium, pp. 249-262.

\* cited by examiner

REDUCING ENERGY CONSUMPTION AND OPTIMIZING WORKLOAD AND PERFORMANCE IN MULTI-TIER STORAGE SYSTEMS USING EXTENT-LEVEL DYNAMIC TIERING

BACKGROUND

Embodiments of the invention relate to the field of data storage, and in particular, to reducing energy consumption and optimizing workload and performance in multi-tier storage systems using extent-level dynamic tiering.

Energy consumption continues to increase in modern data centers because of data growth and new technology development. Energy is an expensive commodity for operations of computing technologies. Energy management is an important consideration for enterprises when architecting an information technology (IT) infrastructure. Data storage is consuming an increasing percentage of data center's energy consumption as the amount of data enterprises store drastically increase. Data storage, in a typical data center, accounts for approximately 40% of the data center's total energy consumption.

Storage tiering is a type of storage architecture that assigns different categories of data to different types of storage media. Storage tiering aims to reduce storage costs to an IT infrastructure, while meeting performance requirements. Tiering categories are primarily based on performance requirements, frequency of use, and levels of protection needed. For example, a first storage tier with expensive high-quality media that provides fault tolerance and reliability (e.g., RAID6, SSD) may be used for mission-critical data. A second storage tier with cheaper and more conventional storage media (e.g., SATA) may be used for non-mission-critical data that is accessed infrequently. A third storage tier with high performance storage (e.g., fiber channel) may be used for frequently accessed data. A fourth storage tier with optical storage (e.g., tape storage) may be used to backup data from another storage tier. Accordingly, storage tiering aligns data's value, importance, and performance requirements with the reliability and performance of the actual storage the data resides on.

Storage workload optimization refers to maximizing utilization of available data storage resources to reduce operating cost and complexity, while meeting data's performance requirements (e.g., serving I/O requests). Performance optimization refers to satisfying data performance requirements and/or achieving the best possible data performance under resource constraints. Workload and performance optimization maximizes storage device and disk utilization by leveraging available storage in an efficient manner, while satisfying data's performance requirements. Storage device and disk utilization directly correlates to storage operational expenses (e.g., energy). For instance, at any given point-in-time all the storage devices in a storage system may not be utilized to near capacity to meet data's required performance. Accordingly, storage workload and performance optimization maximizes a storage system's shared resources, while meeting data's required performance.

BRIEF SUMMARY

Embodiments of the invention relate to reducing energy consumption and optimizing workload and performance in multi-tier storage systems using extent-level dynamic tiering. An aspect of the invention includes a method for reducing energy consumption and optimizing workload and performance in multi-tier storage systems using extent-level dynamic tiering. An exemplary method includes receiving data access information of a storage extent stored in a storage system and utilization information of storage devices in the storage system. The storage system includes a plurality of storage tiers and each of the plurality of storage tiers is made up of a plurality of storage devices. The exemplary method further includes estimating storage resources required for each of the plurality of the storage tiers to satisfy the storage extent's performance and capacity requirements. The estimation of the storage resources is based on the data access information.

The exemplary method further includes determining which one of the storage tiers would incur the lowest power consumption to the storage system for satisfying the storage extent's performance and capacity requirements. The one storage tier is determined by calculating the amount of power that would be consumed by the storage extent in each of the plurality of storage tiers based on the estimated storage resources. The exemplary method further includes determining at least one storage device (among the plurality of storage devices) in the one storage tier that has available storage resources that would satisfy the storage extent's performance and capacity requirements. The determination of the at least one storage device is based on the data access information and utilization information. The exemplary method further includes allocating the storage extent to the one storage tier and to one storage device (among the at least one storage device) that has the least amount of available storage capacity.

Another aspect of the invention includes a computer program product for reducing energy consumption and optimizing workload and performance in multi-tier storage systems using extent-level dynamic tiering. An exemplary computer program product includes a computer program product with a computer readable storage medium that has computer readable program code embodied therewith. The exemplary computer readable program code includes computer readable program code configured to receive data access information of a storage extent stored in a storage system and utilization information of storage devices in the storage system. The storage system includes a plurality of storage tiers and each of the storage tiers is made up of a plurality of storage devices. The exemplary computer readable program code further includes computer readable program code configured to estimate storage resources required for each of the storage tiers to satisfy the storage extent's performance and capacity requirements. The estimation of the storage resources is based on the data access information.

The exemplary computer readable program code further includes computer readable program code configured to determine which one of the plurality of storage tiers would incur the lowest power consumption to the storage system for satisfying the storage extent's performance and capacity requirements. The one storage tier is determined by calculating the amount of power that would be consumed by the storage extent in each of the storage tiers based on the estimated storage resources. The exemplary computer readable program code further includes computer readable program code configured to determine at least one storage device (among the plurality of storage devices) in the one storage tier that has available storage resources that would satisfy the storage extent's performance and capacity requirements. The determination of the at least one storage device is based on the data access information and utilization information. The exemplary computer readable program code further includes computer readable program code configured to allocate the storage extent to the one storage tier and to one storage device (among the at least one storage device) that has the least amount of available storage capacity.

Another aspect of the invention includes a system for reducing energy consumption and optimizing workload and performance in multi-tier storage systems using extent-level dynamic tiering. An exemplary system includes a data collector that receives data access information of a storage extent stored in a storage system and utilization information of storage devices in the storage system. The storage system includes a plurality of storage tiers and each storage tier is made up of a plurality of storage devices. The exemplary system further includes a resource consumption module that estimates storage resources required for each of the plurality of the storage tiers to satisfy the storage extent's performance and capacity requirements. The estimation of the storage resources is based on the data access information.

The exemplary system further includes a placement module that: determines which one of the plurality of storage tiers would incur the lowest power consumption to the storage system for satisfying the storage extent's performance and capacity requirements. The one storage tier is determined by calculating the amount of power that would be consumed by the storage extent in each of the plurality of storage tiers based on the estimated storage resources. The placement module also determines at least one storage device (among the plurality of storage devices) in the one storage tier that has available storage resources that would satisfy the storage extent's performance and capacity requirements. The determination of the at least one storage device is based on the data access information and utilization information. The exemplary system further includes a migrator that allocates the storage extent to the one storage tier and to one storage device (among the at least one storage device) that has the least amount of available storage capacity.

These and other, features, aspects, and advantages of the present invention will be apparent with reference to the following detailed description and appended claims.

DETAILED DESCRIPTION

Embodiments of the invention relate to reducing energy consumption and optimizing workload and performance in multi-tier storage systems using extent-level dynamic tiering. Multi-tier storage systems (e.g., IBM System Storage™ Easy Tier) have active volumes spread between storage tiers with different storage device types. Each storage tier and the storage devices they are made up of have different performance/cost/energy profiles. I/O rates of a workload are typically below peak at most times. Static or semi-static placements are not optimal because those placements are configured for peak-times. Static or semi-static placements configured for peak-times require more energy consumption because the systems are over provisioned during off-peak times. Static or semi-static placement configured for average I/O rates are also not optimal because those placements have decreased performance during peak-times. For example, data storage utilization is dynamic rather than static, which makes data consolidation nontrivial. Therefore, data tiering optimization needs to be a dynamic process to maximize storage resources to adjust to changes in data storage and performance requirements.

Figure 1:
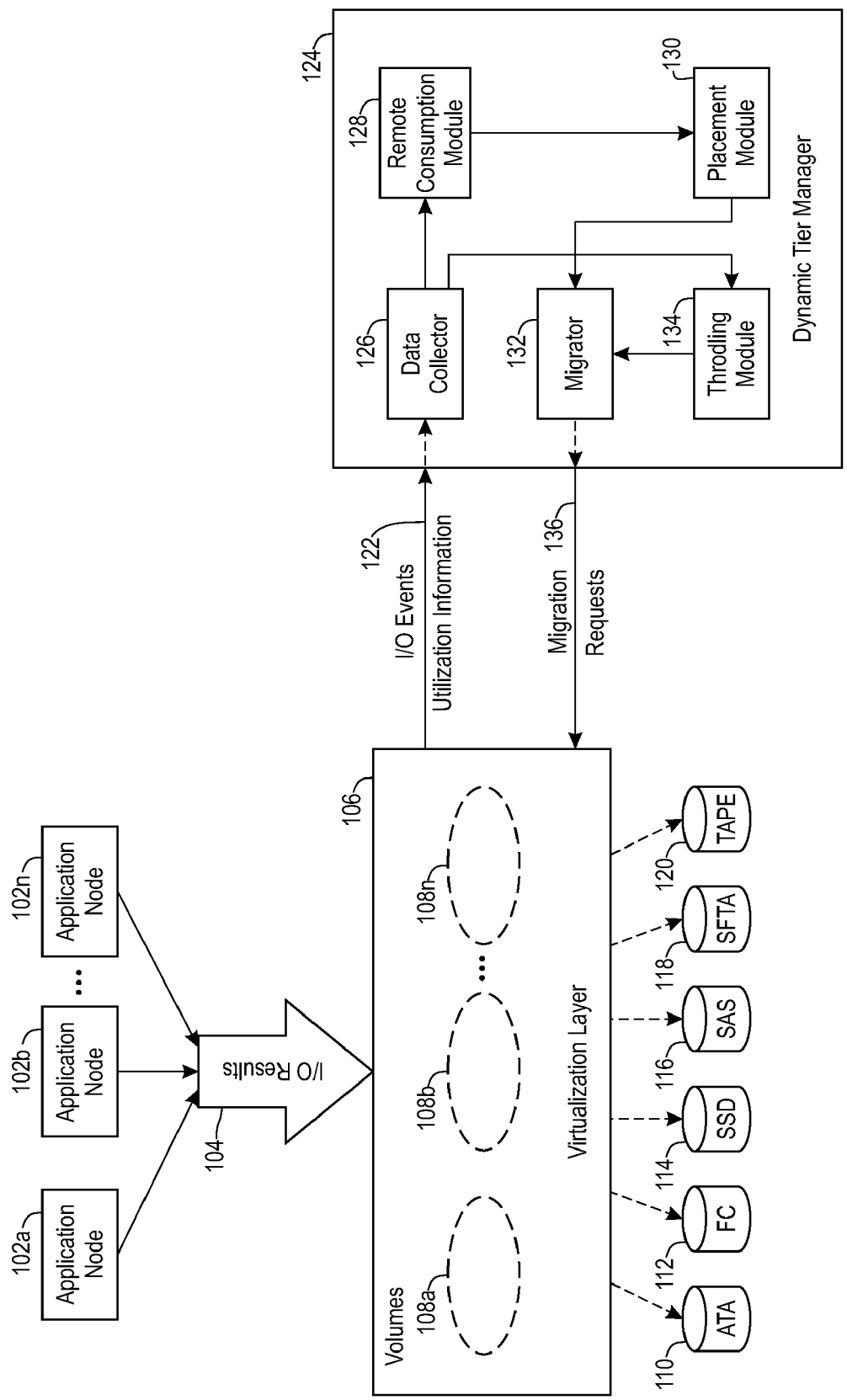
FIG. 1 is a diagram of an exemplary system for reducing energy consumption and optimizing workload and performance in a multi-tier storage system using extent-level tiering, according to one embodiment.

FIG. 1 is a diagram of an exemplary system 100 for reducing energy consumption and optimizing workload and performance in a multi-tier storage system using extent-level tiering, according to one embodiment. A plurality of application nodes 102a, 102b . . . 102n send data access requests 104 (e.g., I/O requests) to a storage system 106. The storage system 106 comprises a plurality of storage tiers 108a, 108b . . . 108n that consist of several storage devices of a particular type. The storage system 106 has virtualization layer and a plurality of storage devices 110, 112, 114, 116, 118 and 120, also referred to as storage arrays. The virtualization layer allows volumes to be made up of storage extents in different storage tiers 108a, 108b . . . 108n and storage devices 110, 112, 114, 116, 118 and 120.

In one embodiment, the storage devices 110, 112, 114, 116, 118 and 120 comprise different storage device types. For example, storage devices 110, 112, 114, 116, 118 and 120 may include, but are not limited to, ATA (Advanced Technology Attachment) storage devices 110, FC (Fibre Channel) storage devices 112, SSD (Solid-State Drive) storage devices 114, SAS (Serial Attached SCSI) storage devices 116, SATA (Serial Advanced Technology Attachment) storage devices 118, and tape storage devices 120. In one embodiment, the storage devices 110, 112, 114, 116, 118 and 120 may be at the same reliability, also referred to as a redundancy level, (e.g., RAID 5), therefore migrating data across arrays is not restricted. In another embodiment, storage extent migration across different reliability levels is controlled by a policy. For example, a policy may enable migrating to a higher RAID level is always acceptable.

In an exemplary embodiment, each of the plurality of storage tiers 108a, 108b . . . 108n includes a grouping of physical storage devices of a single and particular type. For example, a storage tier may be defined as a highly-reliable fibre channel (FC) tier. The FC tier may be comprised by a group of physical storage devices consisting only of a plurality of FC storage devices 112 (e.g., disk drives, storage arrays) with the appropriate storage redundancy scheme (e.g., RAID1). In another example, a different storage tier may be defined as a low-cost SATA tier 118. The SATA tier 118 may be comprised by a group of physical storage devices 110, 112, 114, 116, 118, and 120 consisting only of a plurality of SATA storage devices 118 with the appropriate storage redundancy scheme (e.g., RAID5).

The system 100 further comprises a dynamic tier manager 124. The dynamic tier manager 124 receives storage extent data access information 122 (e.g., I/O event information) from storage system 106. In another embodiment, the dynamic tier manager 124 receives storage device utilization statistics 122 from the storage system 106. The dynamic tier manager 124 includes a data collector 126. The data collector 126 is coupled to a resource consumption module 128 and a throttling module 134. The resource consumption module 128 is coupled to a placement module 130. The placement module 130 and the throttling module 134 are coupled to a migrator 132. The dynamic tier manager 124 sends migration requests 136 to storage system 106.

Figure 2:
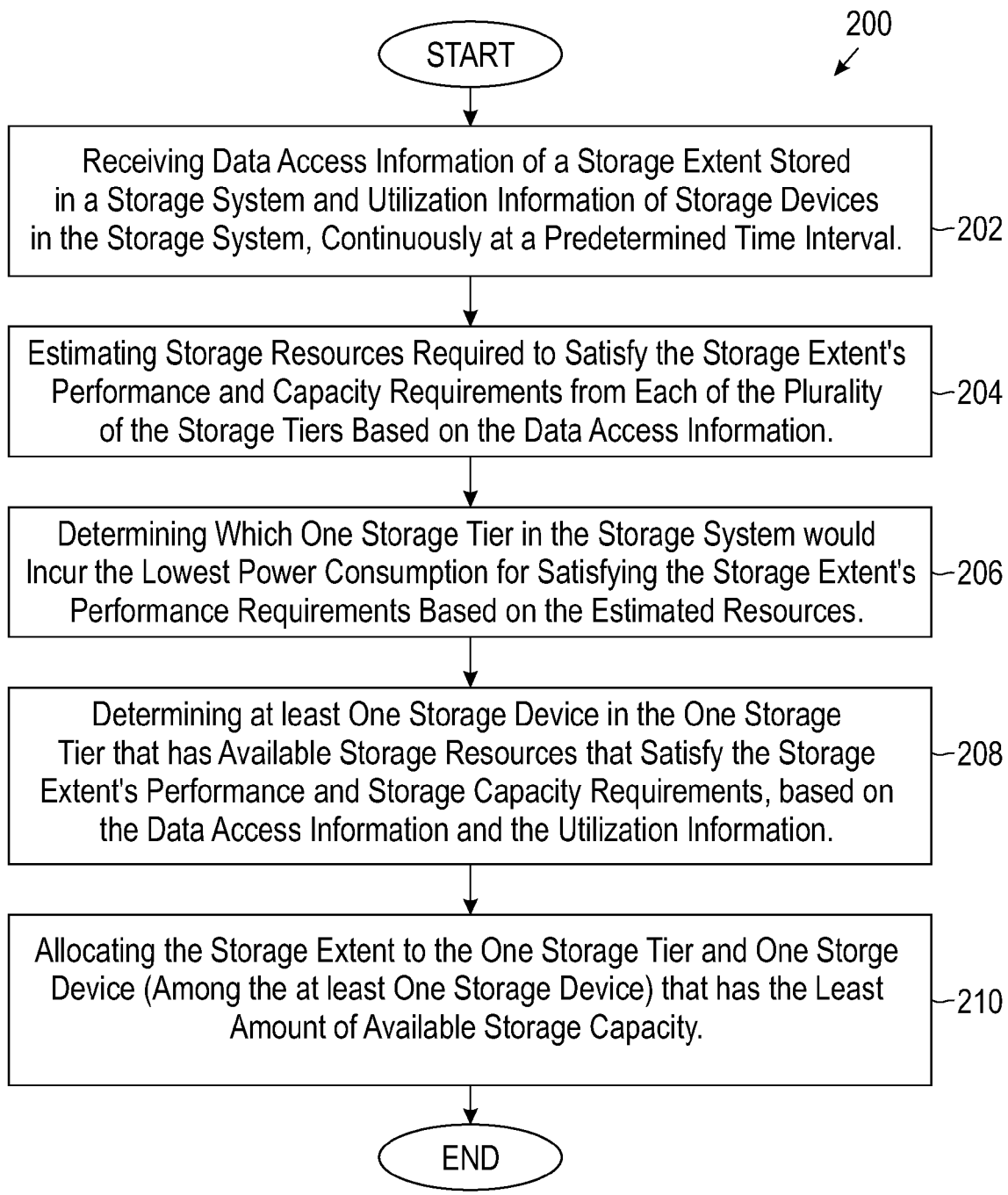
FIG. 2 is a flow chart of a method for reducing energy consumption and optimizing workload and performance in a multi-tier storage system using extent-level tiering, according to one embodiment.

FIG. 2 is a flow chart of a method 200 for reducing energy consumption and optimizing workload and performance in a multi-tier storage system using extent-level tiering, according to one embodiment. In step 202, the data collector 126 receives data access information 122 of storage extents stored in the storage system 106 and utilization information 122 of storage devices 110, 112, 114, 116, 118 . . . 120 in the storage system 106. In one embodiment, the data access information and the utilization information 122 is received continuously at a predetermined time interval. The predetermined time interval selected (e.g., by a system administrator) is system and performance specific. For example, the predetermined time interval to receive data access information 122 and utilization information 122 in a large scale storage architecture may range from 1 minute to 24 hours, with a preferred range of 5 to 10 minutes.

In an exemplary embodiment, the data access information 122 includes performance information of I/Os issued to storage extents (i.e., I/O rate in IOPS (Input/Output Operations per Second)), the size of the storage extent, random I/O bandwidth (i.e., bytes transferred per second). In another exemplary embodiment, the utilization information 122 includes total available storage space, total storage capacity, I/O rate capability, I/O traffic (i.e., random I/O rate), IOPS capacity, and bandwidth capability. In another exemplary embodiment, utilization information includes energy consumed, completed IOPS per Watt, GB per Watt, migration overhead (data transferred, number of I/Os), response time, storage configuration, logical block addressing (LBA) to which an I/O was issued, volume ID, read or write indicator. In one embodiment, the storage system 106 has a firmware data path which can collect and report statistics about the workload being applied.

In an exemplary embodiment, the data collector 126 maps the LBA and volume id of each I/O to a unique storage extent in the storage system 106. The data collector 126 then collects data access information 122 for the storage extents in storage system 106. For example, the number of I/Os, reads or writes, response times, and transfer sizes. The data collector 126 then periodically (e.g. every five minutes) summarizes these values to compute IOPS per extent, average response time, read to write ratio, and average transfer size. In another embodiment, the data collector 126 also combines the current value with previous five-minute intervals to obtain 90-percentile IOPS of a storage extent, and average IOPS of the storage extent over a longer interval.

In one embodiment, the storage system's 106 data placement to the plurality of storage tiers 106 and storage devices 110, 112, 114, 116, 118 . . . 120 is performed at the granularity of a storage extent. The storage extents' size is variable based on preferences for the storage system's 106 performance. For example, preferences for the storage system's 106 performance may include migration latency, data access response speed, data placement efficiency, and metadata overhead. In an exemplary embodiment, the storage extent's size is 64 MB, but may range from tens of megabytes to small number of gigabytes based on the performance preferences and the specific storage system being provisioned.

In step 204, the resource consumption module 128 estimates storage resources required for each of the plurality of the storage tiers 108a, 108b . . . 108n to satisfy the storage extent's performance and capacity requirements. In one embodiment, estimation of the storage resources is based on the data access information 122 received by the data collector 126, which is passed to the resource consumption module 128. In another embodiment, estimation of the storage resources is done by the resource consumption module 128 at each predetermined time interval (after the data collector 126 has passed the data access information).

For example, a storage extent has a storage capacity requirement, $E_c$, and a performance requirement, $E_p$. The storage capacity requirement may be determined by the storage extent's size. In another exemplary embodiment, a storage extent's performance requirement is determined by the storage extent's IOPS and bandwidth requirement, based on previous time intervals. Total space in a storage device is based on the utilization information 122 of storage devices 110, 112, 114, 116, 118 . . . 120 in the storage system 106 received by the data collector 126. In one embodiment, the amount of resource required to host a storage extent's capacity ($RC(E_c,D)$) is computed as:

$$RC(E_c,D) = \text{Capacity required by extent/Total space in device}$$

In one embodiment, a model is used to estimate the amount of resources required (e.g., performance utilization) to support a storage extent's random and sequential workload, and thus satisfy its performance requirements. The performance resource consumption of a storage extent E, when placed on storage device D ($RC(E_p,D)$) is computed as:

$$RC(E_p,D) = RIOR \cdot Rtime + Bandwidth \cdot Xtime$$

For example, RIOR is the random I/O rate. Rtime is defined to be the time consumed to perform a single random I/O. Rtime is estimated to be the sum of average seek time and average rotational delay of device D if D is a hard disk drive (HDD) (e.g., Rtime=data access time for a SSD). Xtime is the time required to transfer a single byte from the device D, assumed to be the inverse of the maximum bandwidth of the device D. In one embodiment, the overall resources estimated to be required by a storage extent is computed as:

$$RC(E,D) = \max(RC(E_p,D), RC(E_c,D))$$

Accordingly, the resource consumption module 128 facilitates selection of the most efficient storage tier (among the plurality of storage tiers 108a, 108b . . . 108n in the storage system 106) for a storage extent to be placed or migrated to by the placement module 130 based on the storage resources it estimated.

In step 206, the placement module 130 determines which one storage tier (among the plurality of storage tiers 108a, 108b . . . 108n in the storage system 106) would incur the lowest power consumption for satisfying the storage extent's performance requirements. Determination of the one storage tier is based on the storage resources estimated by the resource consumption module 128 and passed to the placement module 130.

In one embodiment, the placement module 130 uses a placement algorithm to calculate power consumption to the storage system 106 for satisfying the storage extent's performance requirements from each of the plurality of storage tiers

108a, 108b . . . 108n. For example, the placement algorithm translates a storage extent's estimated storage resources for each storage tier 108a, 108b . . . 108n into power consumption to storage system 106. In an exemplary embodiment, the placement algorithm determines the power consumption by calculating a Fractional Power Burden (i.e., power that would be consumed by an storage extent). The Fractional Power Burden is calculated for each storage extent on each storage tier 108a, 108b . . . 108n in the storage system 106.

The Fractional Power Burden in a tier is the product of the power consumption of a storage device in that tier and the storage extent's resource consumption (RC), computed by the resource consumption module 128, when placed in a storage tier's 108a, 108b . . . 108n storage device 110, 112, 114, 116, 118 . . . 120.

The placement module 130 then selects one storage tier (among the plurality of storage tiers 108a, 108b . . . 108n in storage system 106) that minimizes that Fractional Power Burden. For example, the storage tier that incurs the lowest Fractional Power Burden is chosen as the storage tier for that storage extent. For example, all storage extents are allocated to the most suitable storage tier based on satisfying performance requirements, while incurring the lowest possible power consumption. In an exemplary embodiment, the placement module 130 develops one group per storage tier and each group consists of a list of storage extents for the migrator 132 to migrate the storage extents to that storage tier.

In step 208, the placement module 130 determines at least one storage device (among the plurality of storage devices) in the one selected storage tier that has available storage resources that would satisfy the storage extent's performance and capacity requirements. Determination of the at least one storage device is based on the data access information 122 and utilization information 122 received by the data collector 126 and passed to the placement module 130. The placement module 130 then selects one storage device (among the at least one storage device) that least amount of available storage capacity. The placement module 130 selects particular storage devices to allocate a storage extent to, beginning with a storage device with the least amount of available storage capacity (i.e., space) that can meet its performance requirements. The placement module 130 selects the next storage device with the least amount of available storage capacity if the previous storage device is unable to accommodate the storage extent under consideration due to available storage constraints.

In step 210, the migrator 132 allocates (or migrates) the storage extent to the one storage tier and to the one storage device selected by the placement module 130 to allocate the storage extent to. In an exemplary embodiment, the migrator 132 first performs admission control by checking if the source storage device and target storage device for a storage extent migration request are currently performing any migration. If they are performing migration, the current migration request is re-queued and the migrator 132 moves onto the next migration request. If they are not performing migrations, the migrator 132 issues the migration request.

In another embodiment, each storage extent to be migrated is broken down into several read-write moves, for example, transferring 1 MB of data at a time. At the beginning of each MB transfer, the migrator 132 samples the source storage device's utilization and the target storage device's utilization, and sets its consumed utilization as a migration threshold. The migrator 132 then computes the migration I/O rate using the migration threshold. The migrator 132 then paces the data transfers required for that storage extent at the migration I/O rate. In another embodiment, generated migrations of storage extents are prioritized in the order of decreasing I/O rate to reduce the performance impact on the storage extents.

Figure 3:
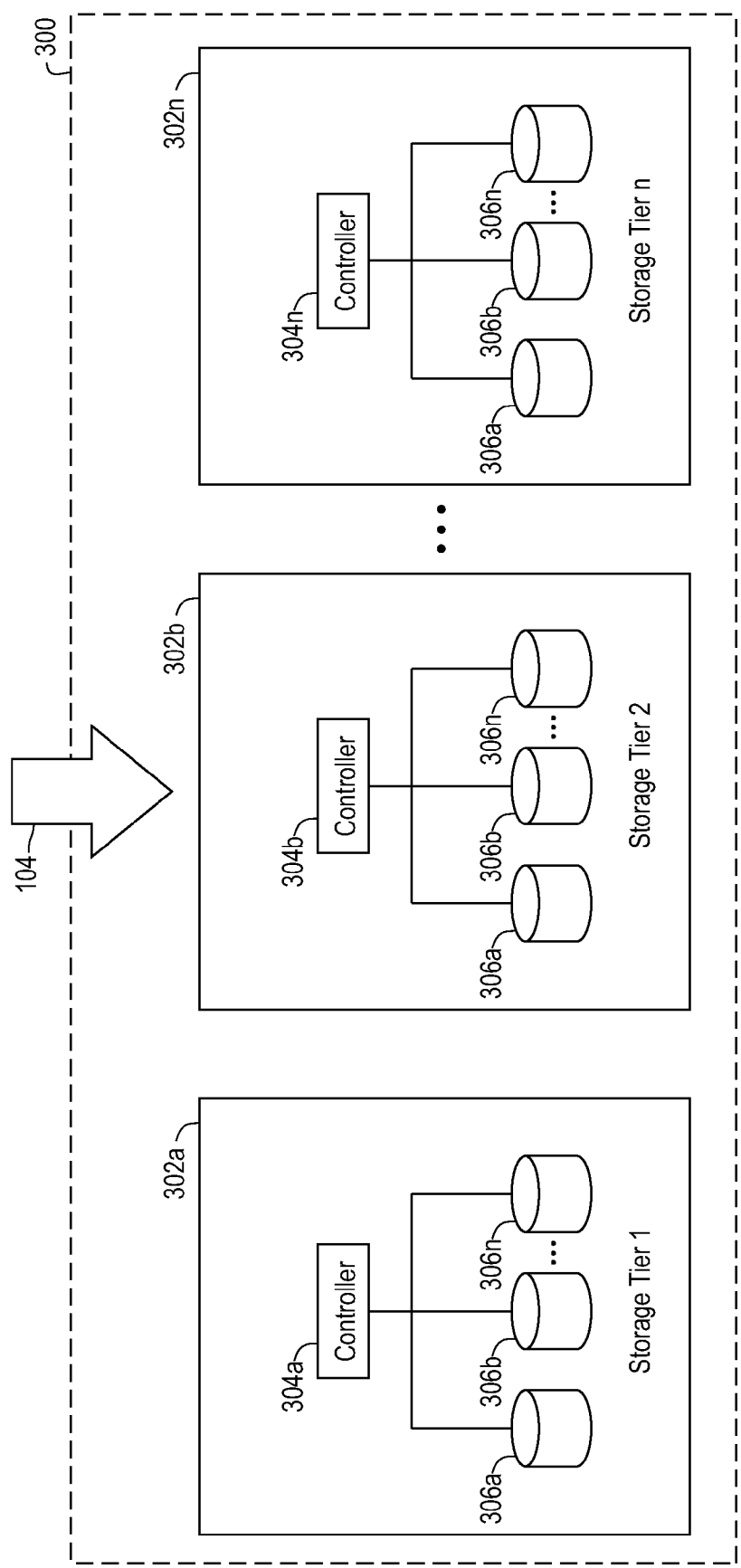
FIG. 3 is a diagram of an exemplary multi-tier storage system, according to one embodiment.

FIG. 3 is a diagram of an exemplary multi-tier storage system 300, according to one embodiment. The multi-tier storage system 300 includes a plurality of storage tiers, storage tier 1 302a, storage tier 2 302b . . . storage tier 3 302n. Each of the plurality of storage tiers, storage tier 1 302a, storage tier 2 302b . . . storage tier 3 302n include a storage controller 304a, 304b . . . 304n.

Each of the plurality of storage tiers, storage tier 1 302a, storage tier 2 302b . . . storage tier 3 302n further include a plurality of storage devices 306a, 306b . . . 306n. Each of the plurality of storage tiers, storage tier 1 302a, storage tier 2 302b . . . storage tier 3 302n has a single and unique type of storage device 306a, 306b . . . 306n. Each of the plurality of storage tiers storage tier 1 302a, storage tier 2 302b . . . storage tier 3 has a different performance/cost/energy profile. For example, each of the plurality of storage tiers storage tier 1 302a, storage tier 2 302b . . . storage tier 3 302n may comprise either a ATA storage device(s) 110, a FC storage device(s) 112, a SSD storage device(s) 114, a SAS storage device(s) 116, a SATA storage device(s) 118, or a tape storage device(s) 120.

Figure 4:
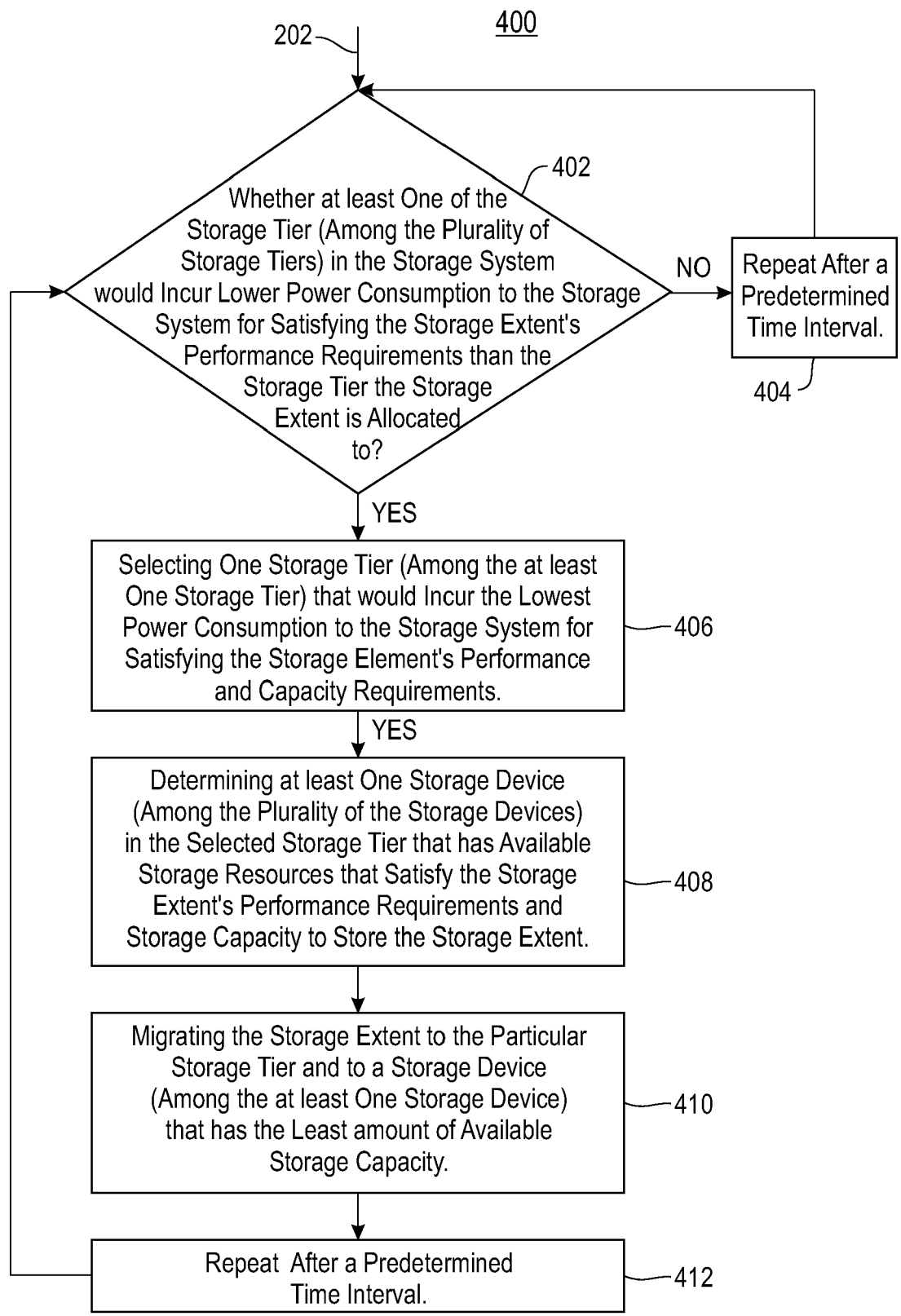
FIG. 4 is a flow chart of a method for reducing power consumption in a multi-tier storage system using extent-level dynamic tiering, according to one embodiment.

FIG. 4 is a flow chart of a method 400 for reducing power consumption in a multi-tier storage system using extent-level dynamic tiering, according to one embodiment. In step 402, the placement module 130 determine if at least one other storage tier (among the plurality of storage tiers 108a, 108b . . . 108n in the storage system 106) would incur lower power consumption to the storage system 106 for satisfying the storage extent's performance and capacity requirements than the storage tier the storage extent is currently allocated to (see step 206). For example, picking an efficient storage device for a storage extent to be allocated to, ensures that data consumes only as much energy as needed to provide the required level of performance, such that the overall energy consumption for the storage extent's workload is minimized while satisfying performance requirements. The determination is in response to the data collector 126 receiving data access information 122 of storage extents stored in the storage system 106 and utilization information 122 of storage devices 110, 112, 114, 116, 118 . . . 120 in the storage system, continuously at a predetermined interval (see step 202).

The method 400 proceeds to step 404 if there is not at least one other storage tier (among the plurality of storage tiers 108a, 108b . . . 108n in the storage system 106) would incur lower power consumption to the storage system 106 for satisfying the storage extent's performance and capacity requirements than the storage tier the storage extent is currently allocated to. In step 404, the method 400 is repeated after the predetermined time interval. The predetermined time interval (e.g., 5 minutes-24 hours) is based on the storage system provisioned and performance preferences. The method 400 proceeds to step 406 if there is at least one other storage tier (among the plurality of storage tiers 108a, 108b . . . 108n in the storage system 106) that would incur lower power consumption to the storage system 106 for satisfying the storage extent's performance and capacity requirements than the storage tier the storage extent is currently allocated to.

In step 406, the placement module 130 selects one storage tier (among the at least one storage tier) that would incur the lowest power consumption to the storage system 106 for satisfying the storage extent's performance and capacity requirements, to allocate the storage extent to (see step 206). In step 408, the placement module 130 determines at least one storage device (among the plurality of storage devices) in the one selected storage tier (selected by the placement module 130 to migrate the storage extent to) that has available storage resources that would satisfy the storage extent's performance and capacity requirements (see step 208). In step 410, the placement module 130 migrates the storage extent (from the storage tier it was allocated) to the one selected storage tier (selected by the placement module 130 to migrate the storage extent to) and to the one storage device (among the at least one storage device) that has the least amount of available storage capacity (see step 210). In step 412, the method 400 is repeated after the predetermined time interval (see step 202).

The predetermined time interval for migration planning is variable and based on a specific storage system's performance preferences. For example, the preferences for the storage system's 106 performance preferences may include overhead to the storage system 106 for storage extent migration. In an exemplary embodiment, the predetermined time interval may be in the range of 1 minute to 24 hours. In another exemplary embodiment, the predetermined time interval may be in the range of 5 minutes to 1 hour, with a preferred time interval between 5 minutes to 10 minutes.

In another embodiment, the placement module 130 determines if the overhead to the storage system 106 for migrating a storage extent to another storage tier (among the plurality of storage tiers 108a, 108b . . . 108n in the storage system 106) negates the cost benefit of moving it to achieve reduced power consumption. In an exemplary embodiment, the overhead depends on the stability of the workload because storage extents that relocate at every time predetermined interval benefit less from migration compared to storage extents that stay longer in a single storage tier longer. Therefore, the placement module 130 does not provide for migrations when the lack of stability causes dynamic migration to be ineffective. For example, workload of a storage extents under consideration for migration need stability such that migration decisions are effective for a certain period of time to accrue energy savings, whereas a storage extents with workloads that fluctuate do not show predictable variations for migrations.

Figure 5:
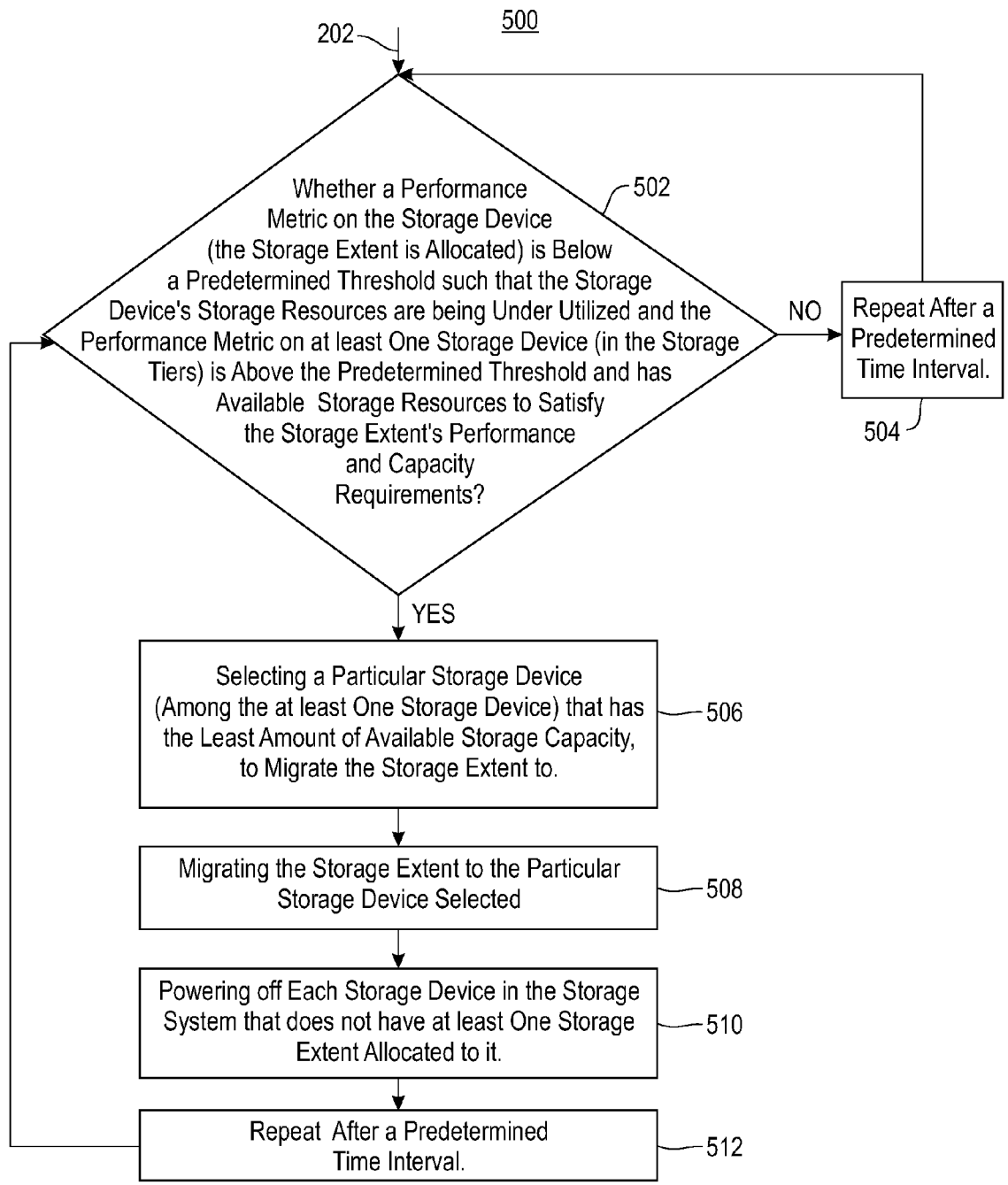
FIG. 5 is a flow chart of a method for optimizing workload in a multi-tier storage system using extent-level dynamic tiering, according to one embodiment.

FIG. 5 is a flow chart of a method 500 for optimizing workload in a multi-tier storage system using extent-level dynamic tiering, according to one embodiment. In an exemplary embodiment, the placement module 130 selects a storage device (in the storage tier the storage extent is allocated to) to migrate the storage extent to, which would optimize workload of storage devices in that storage tier. For example, workload optimization includes placing the maximum number of storage extents on the minimum number of storage devices within a given storage tier, while satisfying the storage extent's performance and capacity requirements. Therefore, under utilized storage devices will have storage extents allocated to it, migrated to another storage device, which better maximizes its storage resources.

In step 502, the throttling module 134 determines whether a performance metric on the storage device (the storage extent is allocated) is below a predetermined threshold such that the storage device's storage resources are being under utilized, and the performance metric on at least one storage device (among the plurality of storage devices in the storage tier the storage extent is allocated) is above the predetermined threshold and has available storage resources to satisfy the storage extent's performance and capacity requirements. The determination is in response to the data collector 126 receiving data access information 122 of storage extents stored in the storage system 106 and utilization information 122 of storage devices 110, 112, 114, 116, 118 . . . 120 in the storage system, continuously at a predetermined interval (see step 202).

In an exemplary embodiment, the performance metric is average response time based on IOPS of storage extents from each active storage device (in each of the plurality of storage tiers 108a, 108b . . . 108n in the storage system 106). Average response time (i.e., IOPS) is selected as a performance metric because increase in response time is a potential indicator for storage resource throttling, or under utilization, since applications expect a higher I/O rate than the storage device can provide, resulting in queuing delays. The predetermined threshold for those performance metrics is system specific based on applications and their performance preferences. In an exemplary embodiment, the predetermined threshold is 50 msecs.

The method 500 proceeds to step 504 if the performance metric on the storage device (the storage extent is allocated) is not below the predetermined threshold such that the storage device's storage resources are not being under utilized, and/or the performance metric on at least one storage device (among the plurality of storage devices in the storage tier the storage extent is allocated) is not above the predetermined threshold or does not have available storage resources to satisfy the storage extent's performance and capacity requirements (see step 208). The method 500 proceeds to step 504 if the performance metric on the storage device (the storage extent is allocated) is below the predetermined threshold such that the storage device's storage resources are being under utilized, and the performance metric on at least one storage device (among the plurality of storage devices in the storage tier the storage extent is allocated) is above the predetermined threshold and has available storage resources to satisfy the storage extent's performance and capacity requirements. Therefore, there is another storage device that is not being throttled or over utilized in the same storage tier. In step 504, the method 500 is repeated after the predetermined time interval.

In step 506, the placement module 130 selects a particular storage device (among the at least one storage device) that has the least amount of available storage capacity, for the storage extent to be migrated to (see step 208). In step 508, the migrator 132 migrates the storage extent from the storage device it is allocated to the particular storage device. In step 510, the storage system 106 powers off each storage device (among the plurality of storage devices 110, 112, 114, 116, 118 . . . 120 in each storage tier 108a, 108b . . . 108n) in the storage system 106 that does not have at least one storage extent allocated to it. In step 512, the method 500 is repeated after the predetermined time interval.

Figure 6:
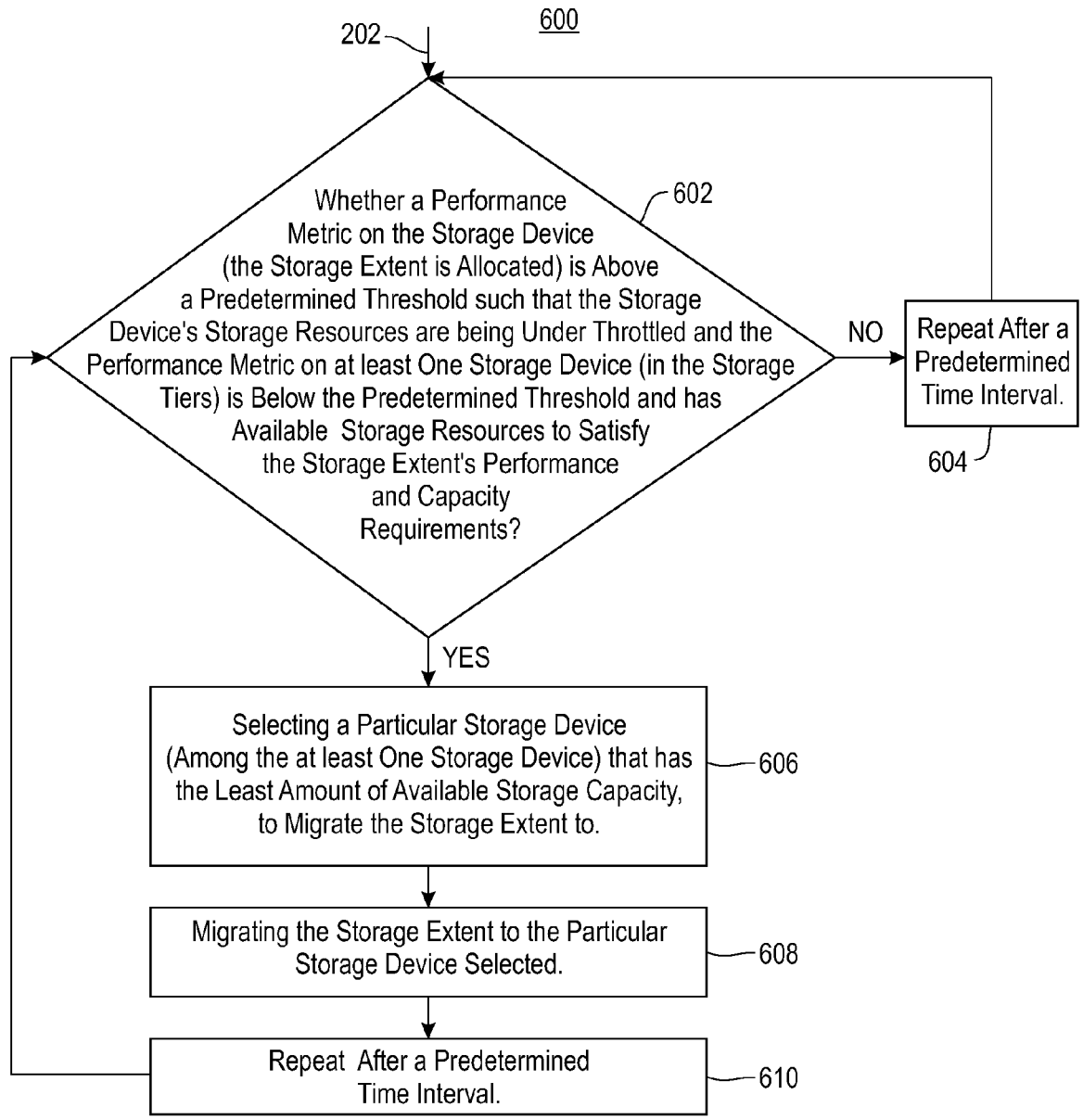
FIG. 6 is a flow chart of a first method for optimizing performance in a multi-tier storage system using extent-level dynamic tiering, according to one embodiment.

FIG. 6 is a flow chart of a first method 600 for optimizing performance in a multi-tier storage system 106 using extent-level dynamic tiering, according to one embodiment. In an exemplary embodiment, the placement module 130 selects a storage device (in the storage tier the storage extent is allocated to) to migrate the storage extent to, which would optimize performance in that storage tier. The storage extent is being migrated because the storage device's storage resource(s) are being throttled. For example, the storage device may not be able to satisfy storage extents' performance requirements if a storage device's storage resource(s) are being throttled, and thus the storage device is being over utilized.

In step 602, the throttling module 134 determines whether a performance metric on the storage device (the storage extent is allocated) is above a predetermined threshold such that the storage device's storage resources are being throttled, and the performance metric on at least one storage device (among the plurality of storage devices) in the storage tier (the storage extent is allocated) is below the predetermined threshold and has available storage resources to satisfy the storage extent's performance and capacity requirements. The determination is in response to the data collector 126 receiving data access information 122 of storage extents stored in the storage system 106 and utilization information 122 of storage devices 110, 112, 114, 116, 118 . . . 120 in the storage system, continuously at a predetermined interval (see step 202). In an exemplary embodiment, the performance metric is average response time based on IOPS of storage extents from each active storage device (in each of the plurality of storage tiers 108a, 108b . . . 108n in the storage system 106).

The method 600 proceeds to step 604, if the performance metric on the storage device (the storage extent is allocated) is not above the predetermined threshold such that the storage device's storage resources are not being throttled, and/or the performance metric on at least one storage device (among the plurality of storage devices) in the storage tier (the storage extent is allocated) is not below the predetermined threshold or does not have available storage resources to satisfy the storage extent's performance and capacity requirements. In step 604, the method 600 repeats after a predetermined time interval.

The method 600 proceeds to 606, if the performance metric on the storage device (the storage extent is allocated) is above the predetermined threshold such that the storage device's storage resources are being throttled, and the performance metric on at least one storage device (among the plurality of storage devices) in the storage tier (the storage extent is allocated) is below the predetermined threshold and has available storage resources to satisfy the storage extent's performance and capacity requirements. In step 606, the placement module 130 selects a particular storage device (among the at least one storage device) that has the least amount of available storage capacity, for the storage extent to be migrated to. In step 608, the migrator 132 migrates the storage extent from the storage device it is allocated to the particular storage device selected by the placement module 130 to migrate the storage extent to. In step 610, the method 600 is repeated after the predetermined time interval.

In one embodiment, the placement module performs migrations as a result of throttling by instantiating one storage device in a high, same, or lower cost tier based on the availability of the storage devices. Once the new array is instantiated, storage extents on the affected storage devices are sorted using their I/O rate, and are placed in a round-robin fashion among the two storage devices (the newly instantiated one, and the throttled one), constrained on their space and I/O rate limitations. The storage devices are monitored for the next time interval chosen, and the process is repeated if the storage devices continue to be throttled. In another embodiment, all the storage extents in the throttled storage device are sorted using their I/O rate requirements, and are placed in a greedy fashion on storage devices sorted by their I/O rate availability.

Figure 7:
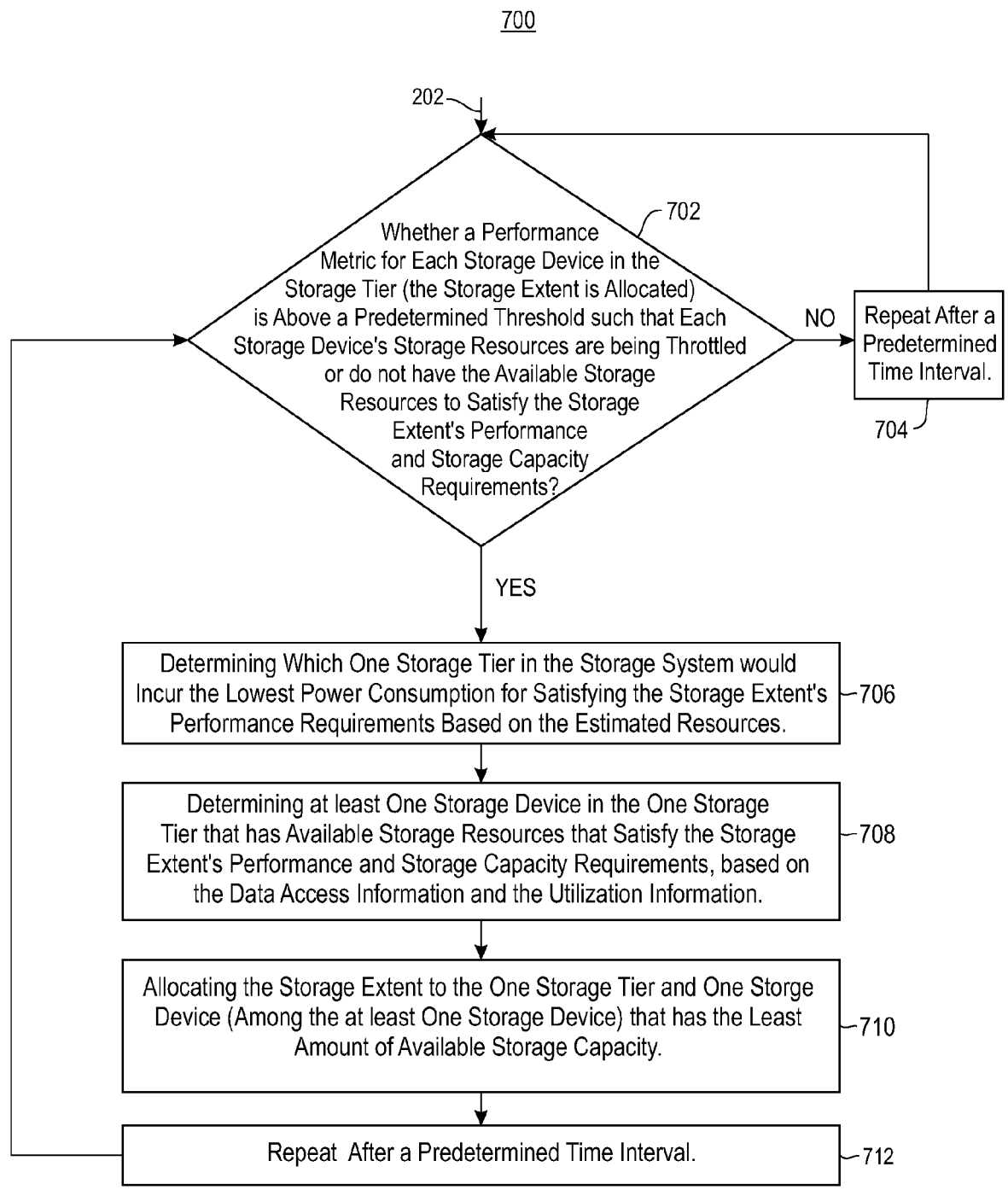
FIG. 7 is a flow chart of a second method for optimizing performance in a multi-tier storage system using extent-level dynamic tiering, according to one embodiment.
Figure 8:
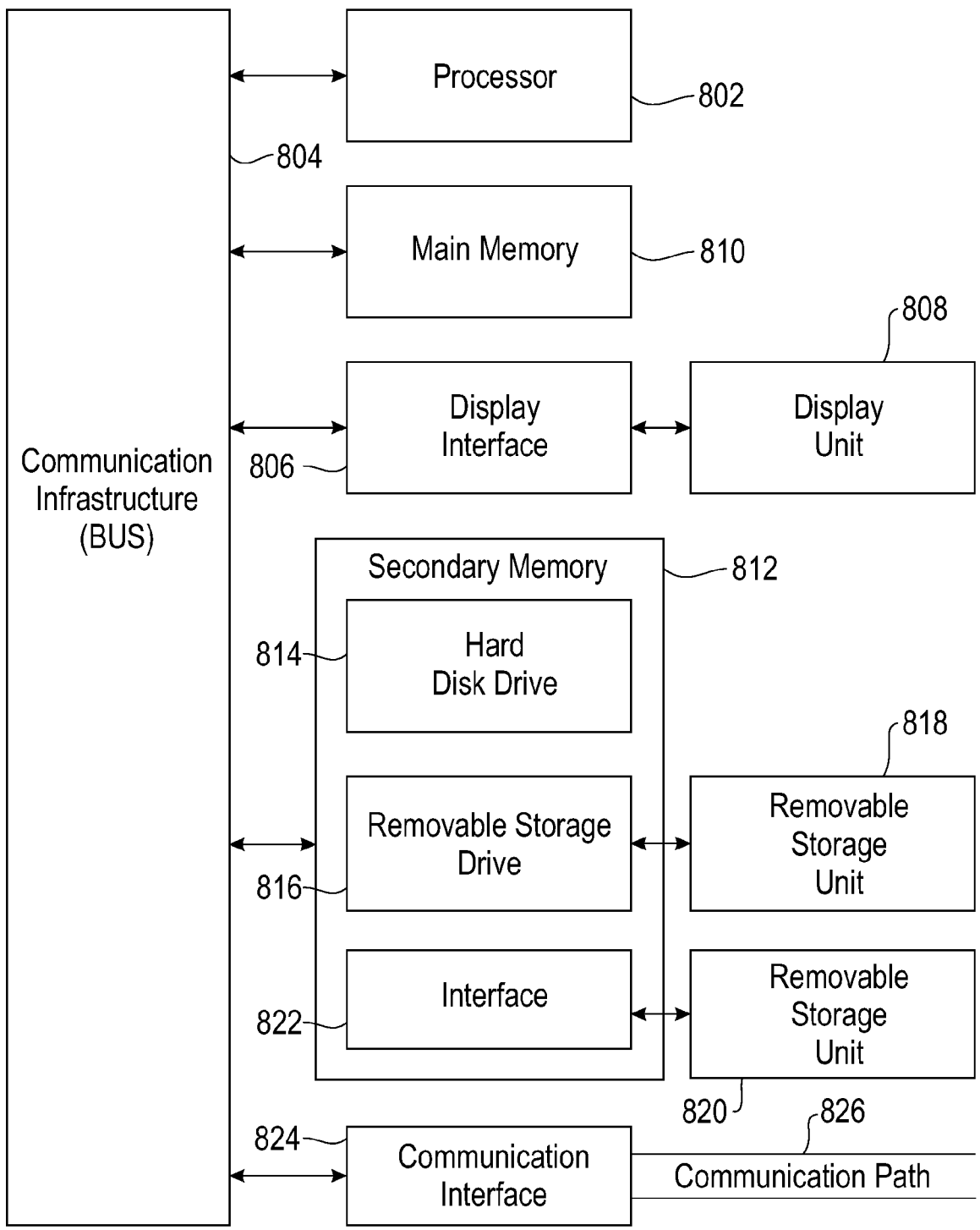
FIG. 8 is a high level block diagram showing an information processing system for implementing an embodiment of the present invention, according to one embodiment.

FIG. 7 is a flow chart of a second method 700 for optimizing performance in a multi-tier storage system using extent-level dynamic tiering, according to one embodiment. In step 702, the throttling module 134 determines if a performance metric for each of the plurality of storage devices in the storage tier (the storage extent is allocated) is above a predetermined threshold such that each of the plurality of storage devices' storage resources are being throttled or do not have available storage resources to satisfy the storage extent's performance and storage capacity requirements. The determination is in response to the data collector 126 receiving data access information 122 of storage extents stored in the storage system 106 and utilization information 122 of storage devices 110, 112, 114, 116, 118 . . . 120 in the storage system, continuously at a predetermined interval (see step 202). In an exemplary embodiment, the performance metric is average response time based on IOPS of storage extents from each active storage device (in each of the plurality of storage tiers 108a, 108b . . . 108n in the storage system 106).

The second method 700 proceeds to step 704 if the performance metric for each of the plurality of storage devices in the storage tier (the storage extent is allocated) is not above the predetermined threshold such that each of the plurality of storage devices' storage resources are not being throttled. In step 704, the second method 700 repeats after a predetermined time interval.

The method 700 proceeds to step 706 if the performance metric for each of the plurality of storage devices in the storage tier (the storage extent is allocated) is above the predetermined threshold such that each of the plurality of storage devices' storage resources are being throttled or do not have available storage resources to satisfy the storage extent's performance and storage capacity requirements. In step 706, the placement module 130 determines which one storage tier (among the plurality of storage tiers 108a, 108b . . . 108n in the storage system 106) would incur the lowest power consumption for satisfying the storage extent's performance requirements (see step 206). The placement module 130 then selects that storage tier to migrate the storage extent to.

In step 708, the placement module 130 determines at least one storage device (among the plurality of storage devices) in the one selected storage tier that has available storage resources that would satisfy the storage extent's performance and capacity requirements (see step 208). In step 710, the migrator 132 migrates the storage extent to the one storage tier and to the one storage device selected by the placement module 130 to migrate the storage extent to. In step 712, the second method 700 is repeated after a predetermined time interval.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 9 is a diagram of a system for implementing an embodiment of the invention. The computer system includes one or more processors, such as a processor 902. The processor 902 is connected to a communication infrastructure 906 (e.g., a communications bus, cross-over bar, or network).

The computer system can include a display interface 906 that forwards graphics, text, and other data from the communication infrastructure 906 (or from a frame buffer not shown) for display on a display unit 908. The computer system also includes a main memory 910, preferably random access memory (RAM), and may also include a secondary memory 912. The secondary memory 912 may include, for example, a hard disk drive 916 and/or a removable storage drive 916, representing, for example, a floppy disk drive, a magnetic tape drive, or an optical disk drive. The removable storage drive 916 reads from and/or writes to a removable storage unit 918 in a manner well known to those having ordinary skill in the art. Removable storage unit 918 represents, for example, a floppy disk, a compact disc, a magnetic tape, or an optical disk, etc., which is read by and written to by removable storage drive 916. As will be appreciated, the removable storage unit 918 includes a computer readable medium having stored therein computer software and/or data.

In alternative embodiments, the secondary memory 912 may include other similar means for allowing computer programs or other instructions to be loaded into the computer system. Such means may include, for example, a removable storage unit 920 and an interface 922. Examples of such means may include a program package and package interface (such as that found in video game devices), a removable memory chip (such as an EPROM, or PROM) and associated socket, and other removable storage units 920 and interfaces 922 which allow software and data to be transferred from the removable storage unit 920 to the computer system.

The computer system may also include a communications interface 926. Communications interface 926 allows software and data to be transferred between the computer system and external devices. Examples of communications interface 926 may include a modem, a network interface (such as an Ethernet card), a communications port, or a PCMCIA slot and card, etc. Software and data transferred via communications interface 926 are in the form of signals which may be, for example, electronic, electromagnetic, optical, or other signals capable of being received by communications interface 926. These signals are provided to communications interface 926 via a communications path (i.e., channel) 926. This communications path 926 carries signals and may be implemented using wire or cable, fiber optics, a phone line, a cellular phone link, an radio frequency (RF) link, and/or other communication channels.

In this document, the terms "computer program medium," "computer usable medium," and "computer readable medium" are used to generally refer to media such as main memory 910 and secondary memory 912, removable storage drive 916, and a hard disk installed in hard disk drive 916.

Computer programs (also called computer control logic) are stored in main memory 910 and/or secondary memory 912. Computer programs may also be received via a communication interface 926. Such computer programs, when run, enable the computer system to perform the features of the present invention as discussed herein. In particular, the computer programs, when run, enable the processor 902 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    receiving data access information of a storage extent stored in a storage system and utilization information of storage devices in the storage system, wherein the storage system comprises a plurality of storage tiers and each of the plurality of storage tiers comprises a plurality of storage devices;
    estimating storage resources required for each of the plurality of the storage tiers to satisfy the storage extent's performance and capacity requirements, wherein estimation of said storage resources is based on said data access information;
    determining which one of the plurality of storage tiers would incur the lowest power consumption to the storage system for satisfying the storage extent's performance and capacity requirements, wherein said one storage tier is determined by calculating the amount of power that would be consumed by the storage extent in each of the plurality of storage tiers based on said estimated storage resources;
    determining at least one storage device (among the plurality of storage devices) in said one storage tier that has available storage resources that would satisfy the storage extent's performance and capacity requirements, wherein said determination of said at least one storage device is based on said data access information and utilization information; and
    allocating the storage extent to said one storage tier and to one storage device (among the at least one storage device) that has the least amount of available storage capacity.

2. The method of claim 1, wherein said data access information and utilization information is received continuously at a predetermined time interval.

3. The method of claim 2, comprising:
    after a predetermined time interval, if at least one storage tier (among the plurality of storage tiers) in the storage system would incur lower power consumption to the storage system for satisfying the storage extent's performance and capacity requirements than said one storage tier, migrating the storage extent from said one storage tier to another storage tier (among the at least one storage tier) that would incur the lowest power consumption the storage system for satisfying the storage extent's performance and capacity requirements.

4. The method of claim 2, comprising:
    after a predetermined time interval, if a performance metric on said one storage device is above a predetermined threshold such that said one storage device's storage resources are being throttled, and the performance metric on at least one storage device (among the plurality of storage devices) in said one storage tier is below the predetermined threshold and has available storage resources to satisfy the storage extent's performance and capacity requirements, migrating the storage extent from said one storage device to another storage device (among the at least one storage device) that has the least amount of available storage capacity.

5. The method of claim 2, comprising:
    after a predetermined time interval, if a performance metric on said one storage device is above a predetermined threshold such that said one storage device's storage resources are being throttled, and the performance metric on each of the plurality of storage devices in said one storage tier are above the predetermined threshold or each of the plurality of storage devices in said one storage tier do not have available storage resources to satisfy the storage extent's performance and capacity requirements, migrating the storage extent from said one storage device to another storage tier (among the plurality of storage tiers) that would incur the lowest power consumption.

6. The method of claim 2, comprising:
    after a predetermined time interval, if a performance metric on said one storage device is below a predetermined threshold such that said one storage device's storage resources are being under utilized, and the performance metric on at least one storage device (among the plurality of storage devices) in said one storage tier is above the predetermined threshold and has available storage resources to satisfy the storage extent's performance and capacity requirements, migrating the storage extent from said one storage device to another storage device (among the at least one storage device) that has the least amount of available storage capacity.

7. The method of claim 6, comprising:
    if a storage device (among the plurality of storage devices in each of the plurality of storage tiers) does not have at least one storage extent allocated to it, powering off the storage device.

8. A computer program product comprising a computer readable storage medium having computer readable program code embodied therewith, the computer readable program code comprising:
- computer readable program code configured to receive data access information of a storage extent stored in a storage system and utilization information of storage devices in the storage system, wherein the storage system comprises a plurality of storage tiers and each of the plurality of storage tiers comprises a plurality of storage devices;
- computer readable program code configured to estimate storage resources required for each of the plurality of the storage tiers to satisfy the storage extent's performance and capacity requirements, wherein estimation of said storage resources is based on said data access information;
- computer readable program code configured to determine which one of the plurality of storage tiers would incur the lowest power consumption to the storage system for satisfying the storage extent's performance and capacity requirements, wherein said one storage tier is determined by calculating the amount of power that would be consumed by the storage extent in each of the plurality of storage tiers based on said estimated storage resources;
- computer readable program code configured to determine at least one storage device (among the plurality of storage devices) in said one storage tier that has available storage resources that would satisfy the storage extent's performance and capacity requirements, wherein said determination of said at least one storage device is based on said data access information and utilization information; and
- computer readable program code configured to allocate the storage extent to said one storage tier and to one storage device (among the at least one storage device) that has the least amount of available storage capacity.

9. The computer program product of claim 8, wherein said data access information and utilization information is received continuously at a predetermined time interval.

10. The computer program product of claim 9, comprising:
- computer readable program code configured to, after a predetermined time interval, if at least one storage tier (among the plurality of storage tiers) in the storage system would incur lower power consumption to the storage system for satisfying the storage extent's performance and capacity requirements than said one storage tier, migrate the storage extent from said one storage tier to a particular storage tier (among the at least one storage tier) that would incur the lowest power consumption the storage system for satisfying the storage extent's performance and capacity requirements.

11. The computer program product of claim 9, comprising:
- computer readable program code configured to, after a predetermined time interval, if a performance metric on said one storage device is above a predetermined threshold such that said one storage device's storage resources are being throttled, and the performance metric on at least one storage device (among the plurality of storage devices) in said one storage tier is below the predetermined threshold and has available storage resources to satisfy the storage extent's performance and capacity requirements, migrate the storage extent from said one storage device to another storage device (among the at least one storage device) that has the least amount of available storage capacity.

12. The computer program product of claim 9, comprising:
- computer readable program code configured to, after a predetermined time interval, if a performance metric on said one storage device is above a predetermined threshold such that said one storage device's storage resources are being throttled, and the performance metric on each of the plurality of storage devices in said one storage tier are above the predetermined threshold or each of the plurality of storage devices in said one storage tier do not have available storage resources to satisfy the storage extent's performance and capacity requirements, migrate the storage extent from said one storage device to another storage tier (among the plurality of storage tiers) that would incur the lowest power consumption.

13. The computer program product of claim 9, comprising:
- computer readable program code configured to, after a predetermined time interval, if a performance metric on said one storage device is below a predetermined threshold such that said one storage device's storage resources are being under utilized, and the performance metric on at least one storage device (among the plurality of storage devices) in said one storage tier is above the predetermined threshold and has available storage resources to satisfy the storage extent's performance and capacity requirements, migrate the storage extent from said one storage device to another storage device (among the at least one storage device) that has the least amount of available storage capacity.

14. The computer program product of claim 13, comprising:
- computer readable program code configured to, if a storage device (among the plurality of storage devices in each of the plurality of storage tiers) does not have at least one storage extent allocated to it, power off the storage device.

15. A system, comprising:
- a data collector that receives data access information of a storage extent stored in a storage system and utilization information of storage devices in the storage system, wherein the storage system comprises a plurality of storage tiers and each of the plurality of storage tiers comprises a plurality of storage devices;
- a resource consumption module that estimates storage resources required for each of the plurality of the storage tiers to satisfy the storage extent's performance and capacity requirements, wherein estimation of said storage resources is based on said data access information;
- a placement module that:
  - determines which one of the plurality of storage tiers would incur the lowest power consumption to the storage system for satisfying the storage extent's performance and capacity requirements, wherein said one storage tier is determined by calculating the amount of power that would be consumed by the storage extent in each of the plurality of storage tiers based on said estimated storage resources, and
  - determine at least one storage device (among the plurality of storage devices) in said one storage tier that has available storage resources that would satisfy the storage extent's performance and capacity requirements, wherein said determination of said at least one storage device is based on said data access information and utilization information; and
- a migrator that allocates the storage extent to said one storage tier and to one storage device (among the at least one storage device) that has the least amount of available storage capacity.

16. The system of claim 15, wherein the data collector is further configured to receive said data access information and utilization information continuously at a predetermined time interval.

17. The system of claim 16, wherein:
the placement module is further configured to, after a predetermined time interval, determine if at least one storage tier (among the plurality of storage tiers) in the storage system would incur lower power consumption to the storage system for satisfying the storage extent's performance and capacity requirements than said one storage tier; and
if the at least one storage tier (among the plurality of storage tiers) in the storage system would incur lower power consumption to the storage system for satisfying the storage extent's performance and capacity requirements than said one storage tier:
the placement module selects a particular storage tier (among the at least one storage tier) that would incur the lowest power consumption to the storage system for satisfying the storage extent's performance and capacity requirements, for the storage extent to be migrated to, and
the migrator migrates the storage extent from said one storage tier to said particular storage tier.

18. The system of claim 16, wherein:
the throttling module is further configured to, after a predetermined time interval, determine if a performance metric on said one storage device is above a predetermined threshold such that said one storage device's storage resources are being over utilized, and the performance metric on at least one storage device (among the plurality of storage devices) in said one storage tier is below the predetermined threshold and has available storage resources to satisfy the storage extent's performance and capacity requirements; and
if the performance metric on said one storage device is above the predetermined threshold and the performance metric on the at least one storage device (among the plurality of storage devices) in said one storage tier is below the predetermined threshold and has available storage resources to satisfy the storage extent's performance and capacity requirements:
the placement module selects a particular storage device (among the at least one storage device) that has the least amount of available storage capacity, for the storage extent to be migrated to, and
the migrator migrates the storage extent from said one storage device to said particular storage device.

19. The system of claim 16, wherein:
the throttling module is further configured to, after a predetermined time interval, determine if a performance metric on said one storage device is above a predetermined threshold such that said one storage device's storage resources are being over utilized, and the performance metric on each of the plurality of storage devices in said one storage tier are above the predetermined threshold or each of the plurality of storage devices in said one storage tier do not have available storage resources to satisfy the storage extent's performance and capacity requirements; and
if the performance metric on said one storage device is above the predetermined threshold, and the performance metric on each of the plurality of storage devices in said one storage tier are above the predetermined threshold or each of the plurality of storage devices in said one storage tier do not have available storage resources to satisfy the storage extent's performance and capacity requirements:
the placement module selects a particular storage tier (among the plurality of storage tiers) in the storage system that would incur the lowest power consumption to the storage system for satisfying the storage extent's performance and capacity requirements, for the storage extent to be migrated to, and
the migrator migrates the storage extent from said one storage tier to said particular storage tier.

20. The system of claim 16, wherein:
the throttling module is further configured to, after a predetermined time interval, determine if a performance metric on said one storage device is below a predetermined threshold such that said one storage device's storage resources are being under utilized, and the performance metric on at least one storage device (among the plurality of storage devices) in said one storage tier is above the predetermined threshold and has available storage resources to satisfy the storage extent's performance and capacity requirements; and
if the performance metric on said one storage device is below the predetermined and the performance metric on the at least one storage device (among the plurality of storage devices) in said one storage tier is above the predetermined threshold and has available storage resources to satisfy the storage extent's performance and capacity requirements:
the placement module selects a particular storage device (among the at least one storage device) that has the least amount of available storage capacity, for the storage extent to be migrated to, and
the migrator migrates the storage extent from said one storage device to said particular storage device.

21. The system of claim 20, wherein:
if a storage device (among the plurality of storage devices in each of the plurality of storage tiers) does not have at least one storage extent allocated to it, the storage system powers off the storage device.

* * * * *